(12) United States Patent
Fu et al.

(10) Patent No.: US 11,693,105 B2
(45) Date of Patent: Jul. 4, 2023

(54) ELECTROMAGNETIC WAVE FIELD DATA PROCESSING METHOD AND APPARATUS, AND MEDIUM

(71) Applicant: INSTITUTE OF GEOLOGY AND GEOPHYSICS, CHINESE ACADEMY OF SCIENCES, Beijing (CN)

(72) Inventors: Changmin Fu, Beijing (CN); Qingyun Di, Beijing (CN); Miaoyue Wang, Beijing (CN); Meigen Zhang, Beijing (CN); Xiaotian Wang, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/420,702

(22) PCT Filed: Apr. 30, 2020

(86) PCT No.: PCT/CN2020/087947
§ 371 (c)(1),
(2) Date: Jul. 5, 2021

(87) PCT Pub. No.: WO2021/196333
PCT Pub. Date: Oct. 7, 2021

(65) Prior Publication Data
US 2023/0021093 A1    Jan. 19, 2023

(30) Foreign Application Priority Data
Mar. 30, 2020 (CN) .......................... 202010237891.8

(51) Int. Cl.
*G01S 13/58* (2006.01)
*G01S 13/88* (2006.01)

(52) U.S. Cl.
CPC ............ *G01S 13/58* (2013.01); *G01S 13/885* (2013.01)

(58) Field of Classification Search
CPC ............................... G01S 13/58; G01S 13/885
See application file for complete search history.

(56) References Cited

U.S. PATENT DOCUMENTS

| 6,429,802 B1 * | 8/2002 | Roberts | .................... G01V 3/12 |
| | | | 342/195 |
| 6,541,984 B2 * | 4/2003 | Kobuchi | ............ G01R 29/0871 |
| | | | 324/637 |

(Continued)

FOREIGN PATENT DOCUMENTS

| CN | 101738642 A | 6/2010 |
| CN | 107167800 A | 9/2017 |

(Continued)

*Primary Examiner* — Bryan Bui
(74) *Attorney, Agent, or Firm* — Cantor Colburn LLP

(57) ABSTRACT

An electromagnetic wave field data processing method is provided and includes determining loss-free electromagnetic wave field data corresponding to electromagnetic wave field data according to the electromagnetic wave field data; performing first amplitude compensation on the electromagnetic wave field data and the loss-free electromagnetic wave field data; extracting waveform information; determining a first sequence corresponding to the electromagnetic wave field data and a second sequence corresponding to the loss-free electromagnetic wave field data which meet a preset condition respectively from the waveform information, determining time sequences corresponding to the first sequence and the second sequence; and determining an attenuation coefficient of the electromagnetic wave field data according to a first preset mode and performing second amplitude compensation on the electromagnetic wave field data according to the attenuation coefficient.

9 Claims, 4 Drawing Sheets

(56) References Cited

U.S. PATENT DOCUMENTS

| 7,528,762 B2 | 5/2009 | Cerwin |
| 2007/0024489 A1 | 2/2007 | Cerwin |

FOREIGN PATENT DOCUMENTS

| CN | 107450054 A | 12/2017 |
| CN | 107576674 A | 1/2018 |
| CN | 109190510 A | 1/2019 |
| CN | 110376584 A | 10/2019 |

\* cited by examiner

```
┌─────────────────────────────────────────────────────────────────────┐ S201
│ Determining, by the electromagnetic wave field data processing system, loss-free
│ electromagnetic wave field data corresponding to actual electromagnetic wave field data
│ according to the actual electromagnetic wave field data
└─────────────────────────────────────────────────────────────────────┘
                                    ↓                                    S202
┌─────────────────────────────────────────────────────────────────────┐
│ Performing, by the electromagnetic wave field data processing system, first amplitude
│ compensation on the actual electromagnetic wave field data and the loss-free electromagnetic
│ wave field data, wherein the first amplitude compensation is to compensate an amplitude
│ error caused by geometrical attenuation to the actual electromagnetic wave field data and the
│ loss-free electromagnetic wave field data
└─────────────────────────────────────────────────────────────────────┘
                                    ↓                                    S203
┌─────────────────────────────────────────────────────────────────────┐
│ Extracting, by the electromagnetic wave field data processing system, waveform information
│ of electromagnetic waves in the actual electromagnetic wave field data and waveform
│ information of electromagnetic waves in the loss-free electromagnetic wave field data
└─────────────────────────────────────────────────────────────────────┘
                                    ↓                                    S204
┌─────────────────────────────────────────────────────────────────────┐
│ Determining, by the electromagnetic wave field data processing system, a first characteristic
│ value sequence corresponding to the actual electromagnetic wave field data and a second
│ characteristic value sequence corresponding to the loss-free electromagnetic wave field data
│ which meet a preset condition respectively from the waveform information of electromagnetic
│ waves in the actual electromagnetic wave field data and the waveform information of
│ electromagnetic waves in the loss-free electromagnetic wave field data, and determining time
│ sequences corresponding to the first characteristic value sequence and the second characteristic
└─────────────────────────────────────────────────────────────────────┘
                                    ↓                                    S205
┌─────────────────────────────────────────────────────────────────────┐
│ Determining, by the electromagnetic wave field data processing system, an attenuation
│ coefficient of the actual electromagnetic wave field data according to a first preset mode and
│ performing second amplitude compensation on the actual electromagnetic wave field data
│ according to the attenuation coefficient, wherein the second amplitude compensation is to
│ compensate an amplitude error caused by the attenuation coefficient to the actual
│ electromagnetic wave field data
└─────────────────────────────────────────────────────────────────────┘
```

Fig. 2

ELECTROMAGNETIC WAVE FIELD DATA PROCESSING METHOD AND APPARATUS, AND MEDIUM

This application is a National Phase of PCT Application No PCT/CN2020/087947 filed Apr. 30, 2020 which claims priority to Chinese Application No. 202010237891.8 filed on Mar. 30, 2020, entitled "ELECTROMAGNETIC WAVE FIELD DATA PROCESSING METHOD AND APPARATUS, AND MEDIUM", which is incorporated herein by reference in its entirety.

TECHNICAL FIELD

The present application relates to the field of geophysical exploration, in particular to an electromagnetic wave field data processing method and apparatus, and a medium.

BACKGROUND

Ground penetrating radar (GPR) is a geophysical method of detecting characteristics and a distribution rule of materials in a medium by transmitting and receiving high frequency electromagnetic waves via an antenna. GPR, featured with high detection speed, continuous detection process, high distinguishability, convenient and flexible operation, low detection cost and the like, is an effective means which is developed in recent decades to detect an underground target, and is primarily applied to the fields of archaeology, mineral exploration, geological hazard survey, geotechnical engineering investigation, project quality detection, building structure detection, military target detection and the like.

As ground penetrating radar waves are propagated in a conductive medium, the wave field of the ground penetrating radar waves will be subjected to attenuation. A medium with high conductivity is larger than a medium with low conductivity in attenuation. For example, ground penetrating radar waves scattered by an underground pipeline buried in humid soil are much weaker than those scattered by the same pipeline buried in dry soil.

In the prior art, attenuation of the wave field is always neglected during processing of the electromagnetic wave field data, such that a result of electromagnetic wave field data detected by the ground penetrating radar is inaccurate.

SUMMARY

In view of this, the embodiments of the present application provide an electromagnetic wave field data processing method and apparatus, and a medium for improving the accuracy of the electromagnetic wave field data detected by the ground penetrating radar in the prior art.

The embodiments of the present application adopt the following technical solutions:

The embodiments of the present application provide an electromagnetic wave field data processing method, including:

determining loss-free electromagnetic wave field data corresponding to actual electromagnetic wave field data according to the actual electromagnetic wave field data;

performing first amplitude compensation on the actual electromagnetic wave field data and the loss-free electromagnetic wave field data, wherein the first amplitude compensation is to compensate an amplitude error caused by geometrical attenuation to the actual electromagnetic wave field data and the loss-free electromagnetic wave field data;

extracting waveform information of electromagnetic waves in the actual electromagnetic wave field data and waveform information of electromagnetic waves in the loss-free electromagnetic wave field data;

determining a first characteristic value sequence corresponding to the actual electromagnetic wave field data and a second characteristic value sequence corresponding to the loss-free electromagnetic wave field data which meet a preset condition respectively from the waveform information of the electromagnetic waves in the actual electromagnetic wave field data and the waveform information of the electromagnetic waves in the loss-free electromagnetic wave field data, and determining time sequences corresponding to the first characteristic value sequence and the second characteristic value sequence; and determining an attenuation coefficient of the actual electromagnetic wave field data according to a first preset mode and performing second amplitude compensation on the actual electromagnetic wave field data according to the attenuation coefficient, wherein the second amplitude compensation is to compensate an amplitude error caused by the attenuation coefficient to the actual electromagnetic wave field data.

Further, the determining loss-free electromagnetic wave field data corresponding to actual electromagnetic wave field data according to the actual electromagnetic wave field data specifically includes:

performing data processing on the acquired actual electromagnetic wave field data, wherein the data processing includes one or more of filtering, deconvolution and zero point time correction;

performing velocity analysis on the processed actual electromagnetic wave field data to obtain a velocity model; and determining loss-free electromagnetic wave field data corresponding to the actual electromagnetic wave field data according to the velocity model.

Further, the first characteristic value sequence corresponding to the actual electromagnetic wave field data of the preset condition is a maximum amplitude value sequence in a plurality of periods of characteristic waveforms corresponding to the actual electromagnetic wave field data or a maximum amplitude absolute value sequence of the plurality of periods in the characteristic waveforms corresponding to the actual electromagnetic wave field data; and the second characteristic value sequence corresponding to the loss-free electromagnetic wave field data of the preset condition is a maximum amplitude value sequence in a plurality of periods of characteristic waveforms corresponding to the loss-free electromagnetic wave field data or a maximum amplitude absolute value sequence in the plurality of periods of the characteristic waveforms corresponding to the loss-free electromagnetic wave field data.

Further, determining an attenuation coefficient of the actual electromagnetic wave field data according to a first preset mode specifically includes:

inputting the first characteristic value sequence, the second characteristic value sequence and the time sequences into a formula $$\ln \frac{\chi(x, t)}{G(x, t)} = -\beta t + b,$$

to determine the attenuation coefficient of the actual electromagnetic wave field data, wherein χ(x>t) is the actual electromagnetic wave field data, G(x,t) is the loss-free electromagnetic wave field data, β is the attenuation coefficient, t is time, x is a distance from a field source to a receiving point, and b is a constant.

Further, after inputting the characteristic value sequence of the actual electromagnetic wave field data, the characteristic value sequence of the loss-free electromagnetic wave field data and the time sequences into the formula $$\ln \frac{\chi(x,t)}{G(x,t)} = -\beta t + b,$$

the method further includes:
performing data fitting on $$\ln \frac{\chi(x,t)}{G(x,t)}$$

and the time t by employing a second preset mode to fit $$\ln \frac{\chi(x,t)}{G(x,t)} = -\beta t + b$$

into a continuous linear function and determining the attenuation coefficient of the actual electromagnetic wave field data according to a slope of the linear function.

Further, the second preset mode is a least square method.

Further, before determining an attenuation coefficient of the actual electromagnetic wave field data according to a first preset mode, the method further includes:

simulating a test wave field by forward modeling and determining an attenuation coefficient of the test electromagnetic wave field data according to the first preset mode; and comparing the attenuation coefficient of the test electromagnetic wave field data with a theoretical value of the attenuation coefficient of the test electromagnetic wave field data to determine whether or not the attenuation coefficient of the test electromagnetic wave field data obtained according to the first preset mode is correct.

Further, the waveform information type of the electromagnetic waves includes a reflected wave or a direct wave.

The embodiments of the present application further provide an electromagnetic wave field data processing apparatus, including:

a first determination unit, configured to determine loss-free electromagnetic wave field data corresponding to actual electromagnetic wave field data according to the actual electromagnetic wave field data;

a first compensation unit, configured to perform first amplitude compensation on the actual electromagnetic wave field data and the loss-free electromagnetic wave field data, wherein the first amplitude compensation is to compensate an amplitude error caused by geometrical attenuation to the actual electromagnetic wave field data and the loss-free electromagnetic wave field data;

an extraction unit, configured to extract waveform information of the electromagnetic waves in the actual electromagnetic wave field data and waveform information of the electromagnetic waves in the loss-free electromagnetic wave field data;

a second determination unit, configured to determine a first characteristic value sequence corresponding to the actual electromagnetic wave field data and a second characteristic value sequence corresponding to the loss-free electromagnetic wave field data which meet a preset condition respectively from the waveform information of the electromagnetic waves in the actual electromagnetic wave field data and the waveform information of the electromagnetic waves in the loss-free electromagnetic wave field data, and determine time sequences corresponding to the first characteristic value sequence and the second characteristic value sequence; and a second compensation unit, configured to determine an attenuation coefficient of the actual electromagnetic wave field data according to a first preset mode and perform second amplitude compensation on the actual electromagnetic wave field data according to the attenuation coefficient, wherein the second amplitude compensation is to compensate an amplitude error caused by the attenuation coefficient to the actual electromagnetic wave field data.

The embodiments of the present application further provide a computer readable medium, storing a computer readable instruction, wherein the computer readable instruction can be executed by a processor to implement the method including:

determining loss-free electromagnetic wave field data corresponding to actual electromagnetic wave field data according to the actual electromagnetic wave field data;

performing first amplitude compensation on the actual electromagnetic wave field data and the loss-free electromagnetic wave field data, wherein the first amplitude compensation is to compensate an amplitude error caused by geometrical attenuation to the actual electromagnetic wave field data and the loss-free electromagnetic wave field data;

extracting waveform information of the electromagnetic waves in the actual electromagnetic wave field data and waveform information of the electromagnetic waves in the loss-free electromagnetic wave field data;

determining a first characteristic value sequence corresponding to the actual electromagnetic wave field data and a second characteristic value sequence corresponding to the loss-free electromagnetic wave field data which meet a preset condition respectively from the waveform information of the electromagnetic waves in the actual electromagnetic wave field data and the waveform information of the electromagnetic waves in the loss-free electromagnetic wave field data, and determining time sequences corresponding to the first characteristic value sequence and the second characteristic value sequence; and determining an attenuation coefficient of the actual electromagnetic wave field data according to a first preset mode and performing second amplitude compensation on the actual electromagnetic wave field data according to the attenuation coefficient, wherein the second amplitude compensation is to compensate an amplitude error caused by the attenuation coefficient to the actual electromagnetic wave field data.

The at least one technical solution adopted by the embodiments of the present application can achieve the following beneficial effect:

the embodiments of the present application improve the result accuracy of the electromagnetic wave field data detected by ground penetrating radar by extracting the waveform information of the electromagnetic waves in the actual electromagnetic wave field data and the waveform information of the electromagnetic waves in the loss-free electromagnetic wave field data, determining the characteristic value sequences which meet the preset condition and the time sequences corresponding to the characteristic value sequences, then determining the attenuation coefficient of the actual wave field according to the first preset method and performing second amplitude compensation on the actual electromagnetic wave field data to eliminate attenuation of the actual electromagnetic wave field data by the attenuation coefficient.

BRIEF DESCRIPTION OF THE DRAWINGS

The drawings described herein are used to provide a further understanding of the present application and form a part of the present application. The illustrative embodiments of the present application and the description thereof are used to explain the present application and do not constitute an improper limitation of the present application. In the drawings:

FIG. 2 is a flow diagram of an electromagnetic wave field data processing method provided by an embodiment II of the description;

DETAILED DESCRIPTION

In order to make purposes, technical solutions and advantages of the present application clearer, the technical solution of the present application will be clearly and completely described below in combination with specific embodiments of the present application and corresponding drawings. Obviously, the described embodiments are merely a part of embodiments of the present application and are not all the embodiments. On a basis of the embodiments in the present application, all other embodiments obtained by those skilled in the technical field without creative efforts fall into the scope of protection of the present application.

Detailed description will be made below to the technical solutions provided by the embodiments of the present application in combination with drawings.

Figure 1:
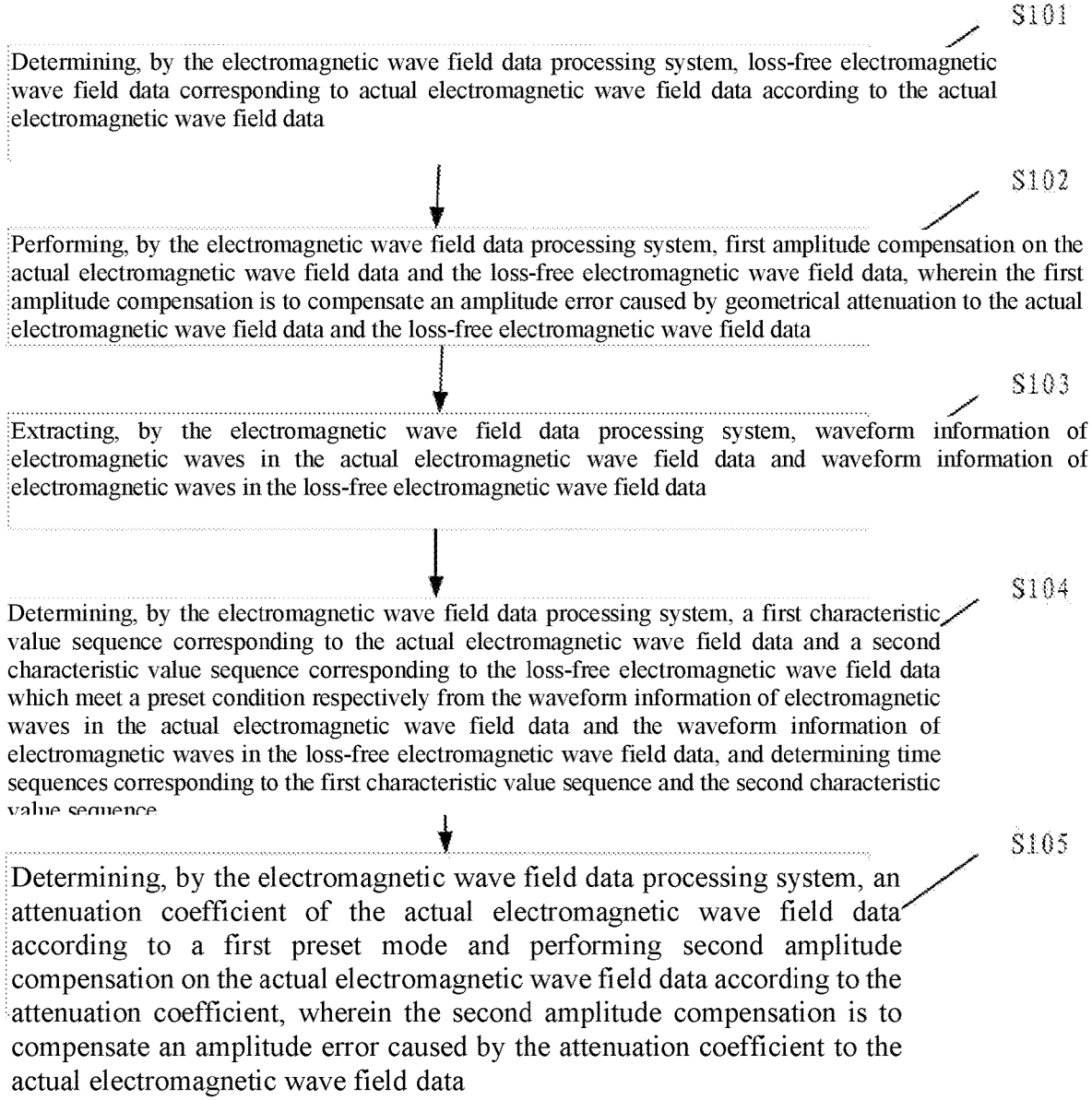
FIG. 1 is a flow diagram of an electromagnetic wave field data processing method provided by an embodiment I of the description.

FIG. 1 is a flow diagram of an electromagnetic wave field data processing method provided by an embodiment I of the description. The embodiment of the description can be executed by an electromagnetic wave field data processing system, and the electromagnetic wave field data processing method specifically includes:

S101, determining, by the electromagnetic wave field data processing system, loss-free electromagnetic wave field data corresponding to actual electromagnetic wave field data according to the actual electromagnetic wave field data;

S102, performing, by the electromagnetic wave field data processing system, first amplitude compensation on the actual electromagnetic wave field data and the loss-free electromagnetic wave field data, wherein the first amplitude compensation is to compensate an amplitude error caused by geometrical attenuation to the actual electromagnetic wave field data and the loss-free electromagnetic wave field data;

S103, extracting, by the electromagnetic wave field data processing system, waveform information of the electromagnetic waves in the actual electromagnetic wave field data and waveform information of the electromagnetic waves in the loss-free electromagnetic wave field data;

S104, determining, by the electromagnetic wave field data processing system, a first characteristic value sequence corresponding to the actual electromagnetic wave field data and a second characteristic value sequence corresponding to the loss-free electromagnetic wave field data which meet a preset condition respectively from the waveform information of the electromagnetic waves in the actual electromagnetic wave field data and the waveform information of the electromagnetic waves in the loss-free electromagnetic wave field data, and determining time sequences corresponding to the first characteristic value sequence and the second characteristic value sequence; and S105, determining, by the electromagnetic wave field data processing system, an attenuation coefficient of the actual electromagnetic wave field data according to a first preset mode and performing second amplitude compensation on the actual electromagnetic wave field data according to the attenuation coefficient, wherein the second amplitude compensation is to compensate an amplitude error caused by the attenuation coefficient to the actual electromagnetic wave field data.

The embodiments of the present application improve the result accuracy of the electromagnetic wave field data detected by ground penetrating radar by extracting the waveform information of the electromagnetic waves in the actual electromagnetic wave field data and the waveform information of the electromagnetic waves in the loss-free electromagnetic wave field data, determining the characteristic value sequences which meet the preset condition and the time sequences corresponding to the characteristic value sequences, then determining the attenuation coefficient of the actual wave field according to the first preset method and performing second amplitude compensation on the actual electromagnetic wave field data to eliminate attenuation of the actual electromagnetic wave field data by the attenuation coefficient.

Corresponding to the embodiment I, FIG. 2 is a flow diagram of an electromagnetic wave field data processing method provided by an embodiment II of the description. The embodiment of the description can be executed by an electromagnetic wave field data processing system. The electromagnetic wave field data processing system is used for processing electromagnetic wave field data acquired by the ground penetrating radar, and the electromagnetic wave field data processing method specifically includes:

S201, determining, by the electromagnetic wave field data processing system, loss-free electromagnetic wave field data corresponding to actual electromagnetic wave field data according to the actual electromagnetic wave field data.

In S201 of the embodiment of the description, the actual electromagnetic wave field data is electromagnetic wave field data actually detected by the ground penetrating radar, and the loss-free electromagnetic wave field data is the electromagnetic wave field data detected by the ground penetrating radar in an ideal condition, i.e., when the attenuation coefficient is zero; the electromagnetic wave field data is ground penetrating radar data (GPR data) and the electromagnetic wave field data is amplitude intensity information; a transmitting antenna of ground penetrating radar transmits high frequency electromagnetic waves to the place below the ground, the electromagnetic waves reflected to the ground are received by a receiving antenna, the electromagnetic waves encountering an interface with an electrical property difference reflect when being propagated in an underground medium, and a spatial position, a structure, a shape and a buried depth of the underground medium are deduced according to received amplitude intensity information.

Determining loss-free electromagnetic wave field data corresponding to actual electromagnetic wave field data according to the actual electromagnetic wave field data specifically includes:

performing data processing on the acquired actual electromagnetic wave field data, wherein the data processing includes one or more of filtering, deconvolution and zero point time correction;

performing velocity analysis on the processed actual electromagnetic wave field data to obtain a velocity model, wherein velocity analysis includes scanning velocities to obtain a velocity spectrum by utilizing different velocity values on the basis of a CMP (common middle point) gather and obtaining the velocity model through the velocity spectrum, wherein the velocity model is a distribution condition of velocities of the electromagnetic waves in the medium;

inputting the velocity model into a formula $$\nabla^2 G(x, t) = \frac{1}{V^2} \frac{\partial^2 G(x, t)}{\partial t^2}$$

to determine loss-free electromagnetic wave field data corresponding to the actual electromagnetic wave field data, wherein $G(x,t)$ is the loss-free electromagnetic wave field data corresponding to the actual electromagnetic wave field data, t is a time sequence, V is a velocity of the electromagnetic wave in the medium and x is a distance from a field source (i.e., a wave field excitation source) to a receiving point (i.e., a wave field receiving end).

It should be noted that the actual electromagnetic wave field data is the currently measured electromagnetic wave field data, and the loss-free electromagnetic wave field data is the electromagnetic wave field data calculated by the formula $$\nabla^2 G(x, t) = \frac{1}{V^2} \frac{\partial^2 G(x, t)}{\partial t^2}.$$

The loss-free electromagnetic wave field data has geometrical attenuation but does not have attenuation caused by the attenuation coefficient, and it can be construed that the attenuation coefficient is 0. The loss-free electromagnetic wave field data here is merely a value calculated by the formula $$\nabla^2 G(x, t) = \frac{1}{V^2} \frac{\partial^2 G(x, t)}{\partial t^2},$$

in the formula, V is just an approximate value, so that $G(x,t)$ obtained is inaccurate, and the loss-free electromagnetic wave field data is further needed to determine the attenuation coefficient to further obtain the accurate actual electromagnetic wave field data, wherein $G(x,t)$ is the loss-free electromagnetic wave field data corresponding to the actual electromagnetic wave field data, t is the time, V is the velocity of the electromagnetic wave in the medium and x is the distance from the field source to the receiving point.

S202, performing, by the electromagnetic wave field data processing system, first amplitude compensation on the actual electromagnetic wave field data and the loss-free electromagnetic wave field data, wherein the first amplitude compensation is to compensate an amplitude error caused by geometrical attenuation to the actual electromagnetic wave field data and the loss-free electromagnetic wave field data.

The geometrical attenuation may be construed as attenuation caused by geometric diffusion, for example, in $G(x,t)$, x is the distance from the field source to the receiving point, i.e., attenuation caused by geometrical diffusion. Regardless of an actual wave field or a loss-free wave field, a distance exists between the field source and the receiving point, and furthermore, the loss-free wave field is only different from the actual wave field in attenuation coefficient and is the same in other parameters, so that in the actual electromagnetic wave field data and the loss-free electromagnetic wave field data, the geometrical attenuation exists. A stacking velocity equivalent method is used in the embodiment of the present application to perform amplitude compensation on the wave field velocity. Wherein, the field source is a transmitting source generating electromagnetic waves.

S203, extracting, by the electromagnetic wave field data processing system, waveform information of electromagnetic waves in the actual electromagnetic wave field data and waveform information of electromagnetic waves in the loss-free electromagnetic wave field data;

In S203 of the embodiment of the description, waveform information of the electromagnetic waves in the actual electromagnetic wave field data is electric field intensity information of the actual electromagnetic wave field, and waveform information of the electromagnetic waves in the loss-free electromagnetic wave field data is electric field intensity of the loss-free electromagnetic wave field. An oscillogram of the electromagnetic waves in the actual wave field and an oscillogram of the electromagnetic waves in the loss-free wave field are oscillograms processed by the S202.

S204, determining, by the electromagnetic wave field data processing system, a first characteristic value sequence corresponding to the actual electromagnetic wave field data and a second characteristic value sequence corresponding to the loss-free electromagnetic wave field data which meet a preset condition respectively from the characteristic waveform information corresponding to the actual electromagnetic wave field data and the characteristic waveform information corresponding to the loss-free electromagnetic wave field data respectively, and determining time sequences corresponding to the first characteristic value sequence and the second characteristic value sequence.

In S204 of the embodiment of the description, the first characteristic value sequence corresponding to the actual electromagnetic wave field data of the preset condition is a maximum amplitude value sequence in a plurality of periods of characteristic waveforms corresponding to the actual electromagnetic wave field data or a maximum amplitude absolute value sequence in the plurality of periods of the characteristic waveforms corresponding to the actual electromagnetic wave field data; and the second characteristic value sequence corresponding to the loss-free electromagnetic wave field data of the preset condition is a maximum amplitude value sequence in a plurality of periods of characteristic waveforms corresponding to the loss-free electromagnetic wave field data or a maximum amplitude absolute value sequence in the plurality of periods of the characteristic waveforms corresponding to the loss-free electromagnetic wave field data, and the time sequences are time values corresponding to the characteristic value sequences. As only different in conductivity, the actual electromagnetic wave field data and the loss-free electromagnetic wave field data are further different in electric field intensity, and the time sequences of the actual electromagnetic wave field data and the loss-free electromagnetic wave field data are the same.

S205, determining, by the electromagnetic wave field data processing system, an attenuation coefficient of the actual electromagnetic wave field data according to a first preset mode, and performing second amplitude compensation on the actual electromagnetic wave field data according to the attenuation coefficient, wherein the second amplitude compensation is to compensate an error caused by the attenuation coefficient to the actual electromagnetic wave field data to eliminate attenuation of the actual electromagnetic wave field data by the attenuation coefficient.

Determining the attenuation coefficient of the actual electromagnetic wave field data according to the first preset mode specifically includes:

obtaining a formula $$\ln \frac{\chi(x,t)}{G(x,t)} = -\beta t + b$$

according to a formula $\chi(x,t)=e^{-\beta t}G(x,t)$, wherein $\chi(x,t)$ is the actual electromagnetic wave field data, $G(x,t)$ is the loss-free electromagnetic wave field data, $\beta$ is the attenuation coefficient, t is time, x is a distance from a field source to a receiving point, and b is a constant; and inputting, by the electromagnetic wave field data processing system, the first characteristic value sequence, the second characteristic value sequence and the time sequences into a formula $$\ln \frac{\chi(x,t)}{G(x,t)} = -\beta t + b$$

to determine the attenuation coefficient $\beta$ of the actual electromagnetic wave field data, wherein the first characteristic value sequence is input into $\chi(x,t)$, and the second characteristic value sequence is input into $G(x,t)$.

After inputting the characteristic value sequence of the actual electromagnetic wave field data, the characteristic value sequence of the loss-free electromagnetic wave field data and the time sequences into the formula $$\ln \frac{\chi(x,t)}{G(x,t)} = -\beta t + b,$$

the method further includes:
performing data fitting on $$\ln \frac{\chi(x,t)}{G(x,t)}$$

and the time t by employing a second preset mode to fit $$\ln \frac{\chi(x,t)}{G(x,t)} = -\beta t + b$$

into a continuous linear function and determining the attenuation coefficient of the actual electromagnetic wave field data according to a slope of the linear function, wherein the attenuation coefficient of the actual electromagnetic wave field data can be an opposite number of the slope of the linear function.

wherein, $G(x,t)$ meets a pure wave equation $$\nabla^2 G(x,t) = \frac{1}{V^2} \frac{\partial^2 G(x,t)}{\partial t^2},$$

wherein V is the velocity of the electromagnetic wave in the medium.

First, correctness of the equation $\chi(x,t)=e^{-\beta t}G(x,t)$ is verified, wherein $e^{-\beta t}$ is an attenuation term, the attenuation coefficient is $$\beta = \frac{\sigma}{2\varepsilon},$$

$\sigma$ is conductivity, and $\varepsilon$ is a dielectric constant.

Formula derivation is verified as follows:

It is verified below that the equation $\chi(x,t)=e^{-\beta t}G(x,t)$ is a solution of the electromagnetic wave equation with an attenuation term, the electromagnetic wave equation with an attenuation term is $$\nabla^2 \chi(x,t) = K_R \frac{\partial^2 \chi(x,t)}{\partial t^2} + K_I \omega \frac{\partial \chi(x,t)}{\partial t},$$

wherein $$K_R = \mu\varepsilon, \quad K_I = \frac{\mu\sigma}{\omega},$$

$\omega$ is frequency, $\mu$ is magnetic conductivity, $\varepsilon$ is a dielectric constant, and $\sigma$ is conductivity.

After substituting the set formula $\chi(x,t)=e^{-\beta t}G(x,t)$ into the equation and it can be obtained that:

$$\begin{cases} \nabla^2 \chi = e^{-\beta t}\nabla^2 G \\ K_R \frac{\partial^2 \chi}{\partial t^2} = K_R \left(\frac{\partial^2 G}{\partial t^2} - 2\beta\frac{\partial G}{\partial t} + \beta^2 G\right)e^{-\beta t} \\ K_I \omega \frac{\partial \chi}{\partial t} = K_I \omega\left(-\beta G + \frac{\partial G}{\partial t}\right)e^{-\beta t} \end{cases}$$

it can be further obtained that:

$$K_R \frac{\partial^2 \chi}{\partial t^2} + K_I \omega \frac{\partial \chi}{\partial t} = K_R\left(\frac{\partial^2 G}{\partial t^2} - 2\beta\frac{\partial G}{\partial t} + \beta^2 G\right)e^{-\beta t} +$$
$$K_I \omega\left(-\beta G + \frac{\partial G}{\partial t}\right)e^{-\beta t}$$
$$= K_R\left(\frac{\partial^2 G}{\partial t^2} + \beta^2 G\right)e^{-\beta t} - K_I \omega\beta G e^{-\beta t} +$$

-continued $$(K_I\omega - 2\beta K_R)\frac{\partial G}{\partial t}e^{-\beta t}$$

After substituting $$\beta = \frac{\sigma}{2\varepsilon}$$

into the above formula, it can be known that:

$$K_R\frac{\partial^2 \chi}{\partial t^2} + K_I\omega\frac{\partial \chi}{\partial t} = K_R\frac{\partial^2 G}{\partial t^2}e^{-\beta t} + K_R\beta^2 Ge^{-\beta t} - K_I\omega\beta Ge^{-\beta t}$$

$$= K_R\frac{\partial^2 G}{\partial t^2}e^{-\beta t} - \mu\frac{\sigma^2}{4\varepsilon}Ge^{-\beta t}$$

$$= \left(\frac{4K_R^2 + K_I^2}{4K_R}\right)\frac{\partial^2 G}{\partial t^2}e^{-\beta t}$$

assuming that $$V = \frac{2\sqrt{K_R}}{\sqrt{4K_R^2 + K_I^2}},$$

it can be obtained that $$\frac{1}{V_I^2}\frac{\partial^2 G(x,t)}{\partial t^2}e^{-\beta t};$$

it can be obtained that $$\frac{\partial^2 G(x,t)}{\partial t^2} = V^2\nabla^2 G \quad \text{from} \quad \nabla^2 G = \frac{1}{V^2}\frac{\partial^2 G(x,t)}{\partial t^2};$$

further, it can be obtained that $$\frac{1}{V^2}\frac{\partial^2 G(x,t)}{\partial t^2}e^{-\beta t} = \frac{1}{V^2}V^2\nabla^2 Ge^{-\beta t} = e^{-\beta t}\nabla^2 G,$$

i.e. $\nabla^2\chi = e^{-\beta t}\nabla^2 G$, it can be known from the above that the equation $\chi(x,t) = e^{-\beta t}G(x,t)$ is the electromagnetic wave field data with attenuation, which accords with the formula.

It should be noted that G is G(x,t) and $\chi$ is $\chi(x,t)$.

It can be know from above expression that the electromagnetic wave field data can be decomposed into two portions: an exponential attenuation term (an attenuation coefficient term) and a field source correlative term (a geometrical attenuation term). It can be obtained from the equation $\chi(x,t) = e^{-\beta t}G(x,t)$ that the electromagnetic wave field data at a point i can be written as $\chi_i(x,t_i+\Delta t) = e^{-\beta(t_i+\Delta t)}G(x,t_i+\Delta t)$.

Wherein, $t_i$ is an arrival time of some signal waveform, $\chi_i$ (if the wave type is a reflected wave) is an actual wave field at the i-th point, and $\Delta t$ is time difference between the arrival time and an amplitude peak value (maximum amplitude value) time. As the electromagnetic wave field data attenuation includes attenuation caused by geometric diffusion as well, first amplitude compensation must be performed on $\chi_i$ and G to eliminate influence of attenuation caused by geometric diffusion.

After correction of attenuation caused by geometric diffusion, $\chi_i(x,\Delta t)$ and $G(x,\Delta t)$ amplitude intensities at x=0, i.e. at the field source, should be equal to $\chi_i(0, \Delta t)$ and $G(0,\Delta t)$. Thus, the equation can be re-written as $\chi_i(0, t_i+\Delta t) = e^{\beta(t_i+\Delta t)}G(0,t_i+\Delta t)$. If let $t_i+\Delta t = m$, $\chi_i(0,t_i+\Delta t) = y(m)$, then $\ln y(m) = \ln G(0,m) - \beta(m) = -\beta m + b$.

According to the above algorithms, after executing the step of inputting the characteristic value sequence of the actual electromagnetic wave field data, the characteristic value sequence of the loss-free electromagnetic wave field data and the time sequences into the formula $$\ln\frac{\chi(x,t)}{G(x,t)} = -\beta t + b,$$

the method further includes:
performing data fitting on $$\ln\frac{\chi(x,t)}{G(x,t)}$$

and the time t by employing a second preset mode to fit $$\ln\frac{\chi(x,t)}{G(x,t)} = -\beta t + b$$

into a continuous linear function and determining the attenuation coefficient of the actual electromagnetic wave field data according to a slope of the linear function.

The second preset mode may be a least square method, an optimum function is determined by minimizing the sum of squares of errors for a function $$\ln\frac{\chi(x,t)}{G(x,t)} = -\beta t + b$$

related to the time sequences and time t by the least square method, thereby fitting the function $$\ln\frac{\chi(x,t)}{G(x,t)} = -\beta t + b$$

and the time t into the continuous linear function. According to the embodiment of the present application, unknown time sequence data is obtained simply by the least square method, and the sum of squares of the errors between these obtained data and the actual data is minimum, so that $$\ln\frac{\chi(x,t)}{G(x,t)} = -\beta t + b$$

is fitted into the continuous linear function.

It should be noted that the waveform information type of the electromagnetic waves extracted in S203 includes a direct wave or a reflected wave. According to the embodiment of the present application, the reflected wave or the direct wave is extracted by a method such as phase recognition and time-distance curve calculation, so that the attenuation coefficient is further solved. Further, before determining the attenuation coefficient of the actual electromagnetic wave field data according to the first preset mode, the method further includes:

simulating a test wave field by forward modeling and determining the attenuation coefficient of the test electromagnetic wave field data according to the first preset mode; and comparing the attenuation coefficient of the test electromagnetic wave field data with a theoretical value of the attenuation coefficient of the test electromagnetic wave field data to verify whether the attenuation coefficient of the test electromagnetic wave field data obtained by the first preset mode is correct or not.

It should be noted that the test wave field is put forward to verify a scheme of solving the attenuation coefficient by the present disclosure, and conductivity of the test wave field can be set manually, so that whether the formula $\chi(x,t)=e^{-\beta t}G(x,t)$ is corrected or not can be verified, wherein $$\beta = \frac{\sigma}{2\varepsilon}.$$

According to the embodiment of the description, a finite difference time domain (FDTD) method may be used to perform forward calculation on the test wave field. The model can be 6 m long and 2 m high, the spatial step can be 0.02 m, the time step can be 0.047 s, and the excitation source, i.e. the field source can be located at (0.4 m, 1.4 m). An excitation source function is a ricker wavelet, the center frequency of which can be 150 MHz. A metal ball, the radius of which is 0.15 m, can be located at (2 m, 1 m).

In the embodiment of the present application, the metal ball, the radius of which is 0.15 m, is used for estimating an average attenuation coefficient on a reflecting path of the metal ball through the reflected wave at the metal ball.

In addition, according to the embodiment of the present application, the conductivity near the metal ball is set as 0.001 S/m and the dielectric constant is 10. Furthermore, the conductivity parameters near the metal ball are set as 0.002 S/m and 0.003 S/m respectively to conduct multiple times of experimental calculation so as to compare a relationship between a calculated value and a theoretical value of the attenuation coefficient.

After a target reflected wave corresponding to conductivity $\sigma=0.001$ is extracted, part of or all data of the reflected wave is used for calculation. As a forward result is very high in signal to noise ratio, the maximum amplitude value in the reflected waveform may be used as the characteristic value of each waveform, all received characteristic value sequences are marked as $\chi_{\sigma=0.001}$, and meanwhile, a receiving time sequence t corresponding to an extreme value is extracted.

According to a Maxwell equation, a forward record without attenuation is constructed, the reflected waveform of the metal ball is extracted, then the amplitude peak value in the reflected waveform is extracted as the characteristic value $\chi_{\sigma=0}$ of each waveform, and meanwhile, a time sequence t corresponding to the peak value sequence is extracted.

As different forward models are only different in conductivity, the obtained forward results are only different in wave field intensity, the positions of the reflected waves are the same, and the time sequences corresponding to the maximum values extracted twice are the same, too.

After the characteristic values under two conditions and the corresponding time sequences are extracted, fitting data can be constructed below. According to an equation $\chi(x,t)=e^{-\beta t}G(x,t)$, a ratio $$R = \frac{\chi_{\sigma=0.001}}{\chi_{\sigma=0}}$$

is made between the two characteristic value sequences, then a logarithm ln(R) is taken to obtain data ln(R) for fitting, and according to an equation $\ln y(m)=\ln G(0,m)-\beta(m)=-\beta m+b$, a data sequence ln(R) and the time sequence t can constitute the linear function. Wherein, $G(x,t)$ is $\sigma=0$.

Data fitting can be performed on the data sequence ln(R) and the time sequence t by using a least square fitting method, and a fitting result is a straight line, and an absolute value of a slope of the straight line is the attenuation coefficient.

The least square method (also referred as to a least square method) is a mathematical optimization technique, searching for the optimum function matching of the data by minimizing the sum of squares of the errors. Unknown data can be obtained simply by the least square method, and the sum of squares of the errors between these obtained data and the actual data is enabled to be minimum. The attenuation coefficient at $\sigma=0.002$ and $\sigma=0.003$ is calculated according to the above steps.

Figure 3:
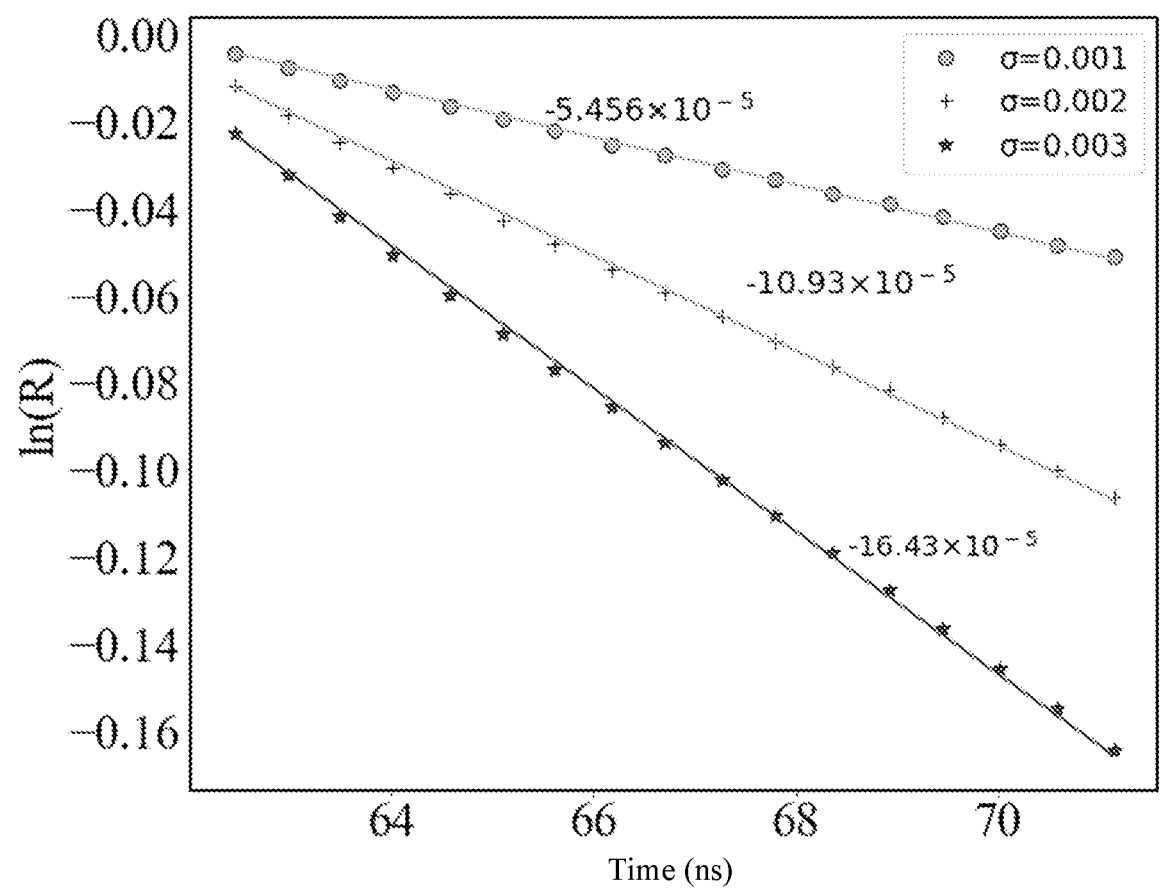
FIG. 3 is a forward modeling result diagram provided by an embodiment II of the description.

Referring to a forward modeling result diagram of FIG. 3, results under different attenuation coefficients are calculated, i.e., the conductivity of a medium around the ball is set as 0.001 S/m, 0.002 S/m and 0.003 S/m respectively. The fitting result obtained by the above method is as follows:

a horizontal axis in FIG. 3 is a sampling time t, and a longitudinal axis is a logarithm ln(R) of the ratio of the characteristic value sequence. When $\sigma=0.001$, the slope of the straight line fitted by the least square method is −0.00005456 and the theoretical value is −0.00005. When $\sigma=0.002$, the slope of the straight line fitted by the least square method is −0.0001093 and the theoretical value is −0.00010. When $\sigma=0.003$, the slope of the straight line fitted by the least square method is −0.0001643 and the theoretical value is −0.00015, see table 1 for details.

TABLE 1

Comparison on calculation results of attenuation coefficients

| | Theoretical value β | Slope of straight line β |
|---|---|---|
| σ = 0.001 | 5 × 10⁻⁵ | 5.46 × 10⁻⁵ |
| σ = 0.002 | 10 × 10⁻⁵ | 10.93 × 10⁻⁵ |
| σ = 0.003 | 15 × 10⁻⁵ | 16.43 × 10⁻⁵ |

It can be seen from the table 1 that the calculated attenuation coefficient is quite approximate to the theoretical calculated value, indicating that the result obtained by the solution is relatively accurate. The method for calculating the attenuation coefficient provided by the embodiment of the description is small in calculating amount and high in speed. The attenuation coefficient of the electromagnetic wave propagated in the underground medium can be calculated quickly and conveniently according to the solution of the embodiment of the description.

Under a common circumstance, the actual electromagnetic wave field data is not only related to the velocity V, but also is related to β. In conventional processing, influence of β is neglected usually. However, under a circumstance of a high enough σ (conductivity), influence of the attenuation coefficient cannot be neglected. Under the circumstance, β is determined first. The method of calculating β provided by the embodiment of the present application can be used for compensating intensity attenuation of the electric field data. Conventional velocity analysis is performed with corrected data. After compensating correction of β, the velocity analysis result will be more reliable, and further, a GPR migration result is further more reliable.

The embodiments of the present application improve the result accuracy of the electromagnetic wave field data result detected by ground penetrating radar by extracting the waveform information of the electromagnetic waves in the actual electromagnetic wave field data and the waveform information of the electromagnetic waves in the loss-free electromagnetic wave field data, determining the characteristic value sequences which meet the preset condition and the time sequences corresponding to the characteristic value sequences, then determining the attenuation coefficient of the actual wave field according to the first preset method, and performing second amplitude compensation on the actual electromagnetic wave field data to eliminate attenuation of the actual electromagnetic wave field data by the attenuation coefficient.

Figure 4:
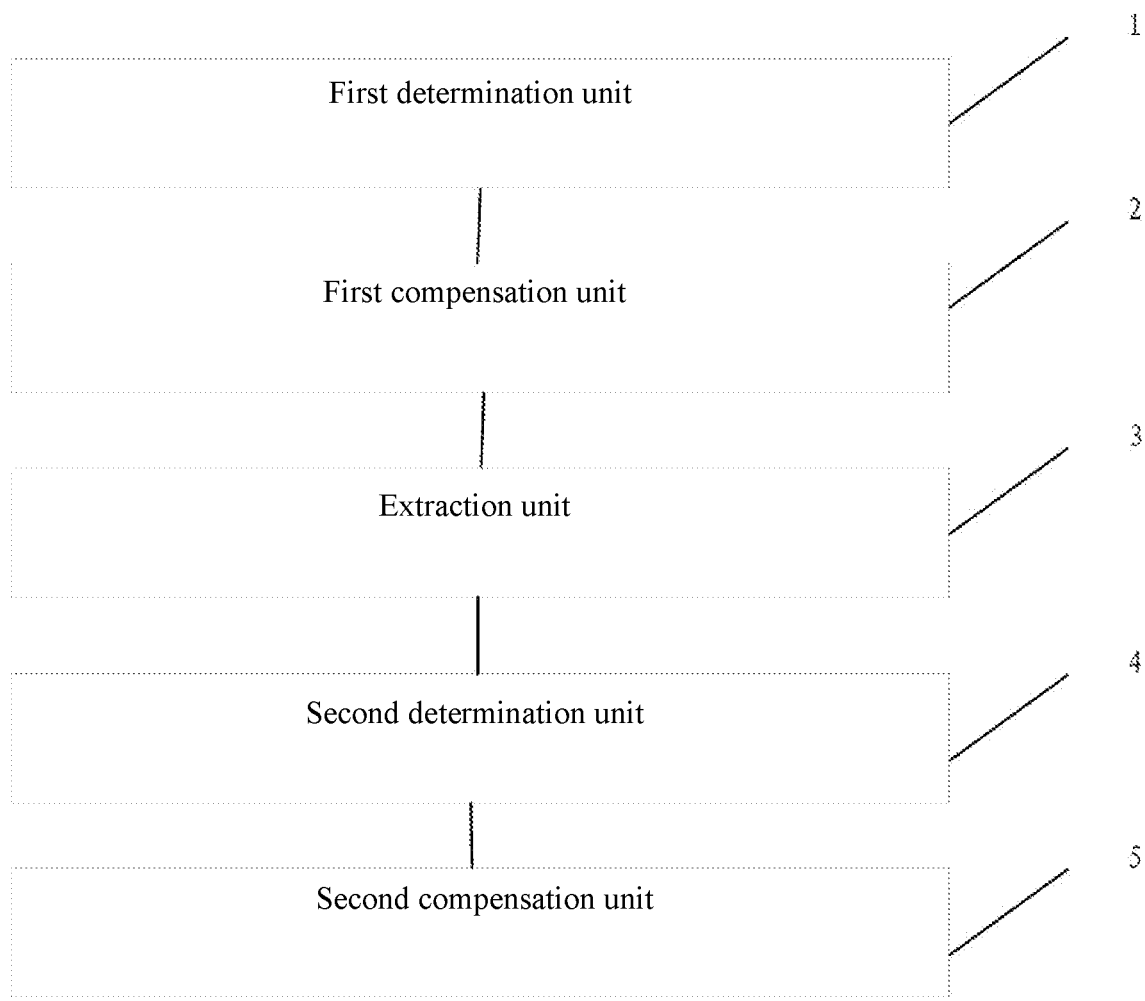
FIG. 4 is a structural schematic diagram of an electromagnetic wave field data processing apparatus provided by an embodiment III of the description.

Corresponding to the embodiment II, FIG. 4 is a structural schematic diagram of an electromagnetic wave field data processing apparatus provided by the embodiment III of the description. The electromagnetic wave field data processing apparatus includes a first determination unit 1, a first compensation unit 2, an extraction unit 3, a second determination unit 4 and a second compensation unit 5.

The first determination unit 1 is configured to determine loss-free electromagnetic wave field data corresponding to actual electromagnetic wave field data according to the actual electromagnetic wave field data;

the first compensation unit 2 is configured to perform first amplitude compensation on the actual electromagnetic wave field data and the loss-free electromagnetic wave field data, wherein the first amplitude compensation is to compensate an amplitude error caused by geometrical attenuation to the actual electromagnetic wave field data and the loss-free electromagnetic wave field data;

the extraction unit 3 is configured to extract waveform information of electromagnetic waves in the actual electromagnetic wave field data and waveform information of electromagnetic waves in the loss-free electromagnetic wave field data;

the second determination unit 4 is configured to determine a first characteristic value sequence corresponding to the actual electromagnetic wave field data and a second characteristic value sequence corresponding to the loss-free electromagnetic wave field data which meet a preset condition respectively from the waveform information of the electromagnetic waves in the actual electromagnetic wave field data and the waveform information of the electromagnetic waves in the loss-free electromagnetic wave field data, and determine time sequences corresponding to the first characteristic value sequence and the second characteristic value sequence; and the second compensation unit 5 is configured to determine an attenuation coefficient of the actual electromagnetic wave field data according to a first preset mode and perform second amplitude compensation on the actual electromagnetic wave field data according to the attenuation coefficient, wherein the second amplitude compensation is to compensate an amplitude error caused by the attenuation coefficient to the actual electromagnetic wave field data.

The embodiments of the present application further provide a computer readable medium, storing a computer readable instruction, wherein the computer readable instruction can be executed by a processor to implement the method including:

determining loss-free electromagnetic wave field data corresponding to actual electromagnetic wave field data according to the actual electromagnetic wave field data;

performing first amplitude compensation on the actual electromagnetic wave field data and the loss-free electromagnetic wave field data, wherein the first amplitude compensation is to compensate an amplitude error caused by geometrical attenuation to the actual electromagnetic wave field data and the loss-free electromagnetic wave field data;

extracting waveform information of electromagnetic waves in the actual electromagnetic wave field data and waveform information of electromagnetic waves in the loss-free electromagnetic wave field data;

determining a first characteristic value sequence corresponding to the actual electromagnetic wave field data and a second characteristic value sequence corresponding to the loss-free electromagnetic wave field data which meet a preset condition respectively from the waveform information of electromagnetic waves in the actual electromagnetic wave field data and the waveform information of electromagnetic waves in the loss-free electromagnetic wave field data, and determining time sequences corresponding to the first characteristic value sequence and the second characteristic value sequence; and determining an attenuation coefficient of the actual electromagnetic wave field data according to a first preset mode and performing second amplitude compensation on the actual electromagnetic wave field data according to the attenuation coefficient, wherein the second amplitude compensation is to compensate an amplitude error caused by the attenuation coefficient to the actual electromagnetic wave field data.

The embodiments of the present application improve the result accuracy of the electromagnetic wave field data detected by ground penetrating radar by extracting the waveform information of the electromagnetic waves in the actual electromagnetic wave field data and the waveform information of the electromagnetic waves in the loss-free electromagnetic wave field data, determining the characteristic value sequences which meet the preset condition and the time sequences corresponding to the characteristic value sequences, determining the attenuation coefficient of the actual wave field according to the first preset method and performing second amplitude compensation on the actual electromagnetic wave field data to eliminate attenuation of the actual electromagnetic wave field data by the attenuation coefficient.

The above is only embodiments of the present application and is not used to limit the present application. For those skilled in the art, the present application may have various changes and variations. Any modification, equivalent replacements, improvement, etc. made within the spirit and principle of the present application shall be included in the scope of the claims of the present application.

The invention claimed is:

1. An electromagnetic wave field data processing method, comprising:

determining loss-free electromagnetic wave field data corresponding to actual electromagnetic wave field data according to the actual electromagnetic wave field data;

performing a first amplitude compensation on the actual electromagnetic wave field data and the loss-free electromagnetic wave field data, wherein the first amplitude compensation is to compensate an amplitude error caused by geometrical attenuation to the actual electromagnetic wave field data and the loss-free electromagnetic wave field data;

extracting waveform information of electromagnetic waves in the actual electromagnetic wave field data and waveform information of electromagnetic waves in the loss-free electromagnetic wave field data;

determining a first characteristic value sequence corresponding to the actual electromagnetic wave field data and a second characteristic value sequence corresponding to the loss-free electromagnetic wave field data which meet a preset condition respectively from the waveform information of the electromagnetic waves in the actual electromagnetic wave field data and the waveform information of the electromagnetic waves in the loss-free electromagnetic wave field data, and determining time sequences corresponding to the first characteristic value sequence and the second characteristic value sequence; and determining an attenuation coefficient of the actual electromagnetic wave field data according to a first preset mode, and performing a second amplitude compensation on the actual electromagnetic wave field data according to the attenuation coefficient, wherein the second amplitude compensation is to compensate an amplitude error caused by the attenuation coefficient to the actual electromagnetic wave field data;

wherein determining an attenuation coefficient of the actual electromagnetic wave field data according to a first preset mode comprises:

inputting the first characteristic value sequence, the second characteristic value sequence and the time sequences into a formula $$\ln \frac{X(x, t)}{G(x, t)} = -\beta t + b$$

to determine the attenuation coefficient of the actual electromagnetic wave field data, wherein X(x,t) is the actual electromagnetic wave field data, G(x,t) is the loss-free electromagnetic wave field data, β is the attenuation coefficient, t is time, x is a distance from a field source to a receiving point, and b is a constant.

2. The electromagnetic wave field data processing method according to claim 1, wherein the determining loss-free electromagnetic wave field data corresponding to actual electromagnetic wave field data according to the actual electromagnetic wave field data specifically comprises:

performing data processing on the acquired actual electromagnetic wave field data, wherein the data processing comprises one or more of filtering, deconvolution and zero point time correction;

performing velocity analysis on the processed actual electromagnetic wave field data to obtain a velocity model; and determining loss-free electromagnetic wave field data corresponding to the actual electromagnetic wave field data according to the velocity model.

3. The electromagnetic wave field data processing method according to claim 1, wherein the first characteristic value sequence corresponding to the actual electromagnetic wave field data of the preset condition is a maximum amplitude value sequence in a plurality of periods of characteristic waveforms corresponding to the actual electromagnetic wave field data or a maximum amplitude absolute value sequence in the plurality of periods of the characteristic waveforms corresponding to the actual electromagnetic wave field data; and the second characteristic value sequence corresponding to the loss-free electromagnetic wave field data of the preset condition is a maximum amplitude value sequence in a plurality of periods of characteristic waveforms corresponding to the loss-free electromagnetic wave field data or a maximum amplitude absolute value sequence in the plurality of periods of the characteristic waveforms corresponding to the loss-free electromagnetic wave field data.

4. The electromagnetic wave field data processing method according to claim 1, wherein after inputting the characteristic value sequence of the actual electromagnetic wave field data, the characteristic value sequence of the loss-free electromagnetic wave field data and the time sequences into the formula $$\ln \frac{X(x, t)}{G(x, t)} = -\beta t + b,$$

the method further comprises:

performing data fitting on $$\ln \frac{X(x, t)}{G(x, t)}$$

and the time t by employing a second preset mode to fit $$\ln \frac{X(x, t)}{G(x, t)} = -\beta t + b$$

into a continuous linear function and determining an attenuation coefficient of the actual electromagnetic wave field data according to a slope of the linear function.

5. The electromagnetic wave field data processing method according to claim 4, wherein the second preset mode is a least square method.

6. The electromagnetic wave field data processing method according to claim 1, wherein before determining an attenuation coefficient of the actual electromagnetic wave field data according to a first preset mode, the method further comprises:

simulating a test wave field by forward modeling and determining an attenuation coefficient of the test electromagnetic wave field data according to the first preset mode; and comparing the attenuation coefficient of the test electromagnetic wave field data with a theoretical value of the attenuation coefficient of the test electromagnetic wave field data to determine whether or not the attenuation coefficient of the test electromagnetic wave field data obtained by the first preset mode is correct.

7. The electromagnetic wave field data processing method according to claim 1, wherein a waveform information type of the electromagnetic waves comprises a reflected wave or a direct wave.

8. A computer readable medium, storing a computer readable instruction, wherein the computer readable instruction can be executed by a processor to implement the method according to claim 1.

9. An electromagnetic wave field data processing apparatus, comprising:
- a first determination unit, configured to determine loss-free electromagnetic wave field data corresponding to actual electromagnetic wave field data according to the actual electromagnetic wave field data;
- a first compensation unit, configured to perform a first amplitude compensation on the actual electromagnetic wave field data and the loss-free electromagnetic wave field data, wherein the first amplitude compensation is to compensate an amplitude error caused by geometrical attenuation to the actual electromagnetic wave field data and the loss-free electromagnetic wave field data;
- an extraction unit, configured to extract waveform information of electromagnetic waves in the actual electromagnetic wave field data and waveform information of electromagnetic waves in the loss-free electromagnetic wave field data;
- a second determination unit, configured to determine a first characteristic value sequence corresponding to the actual electromagnetic wave field data and a second characteristic value sequence corresponding to the loss-free electromagnetic wave field data which meet a preset condition respectively from the waveform information of the electromagnetic waves in the actual electromagnetic wave field data and the waveform information of the electromagnetic waves in the loss-free electromagnetic wave field data, and determine time sequences corresponding to the first characteristic value sequence and the second characteristic value sequence; and
- a second compensation unit, configured to determine an attenuation coefficient of the actual electromagnetic wave field data according to a first preset mode and a perform second amplitude compensation on the actual electromagnetic wave field data according to the attenuation coefficient, wherein the second amplitude compensation is to compensate an amplitude error caused by the attenuation coefficient to the actual electromagnetic wave field data;
- wherein determining an attenuation coefficient of the actual electromagnetic wave field data according to a first preset mode comprises:
- inputting the first characteristic value sequence, the second characteristic value sequence and the time sequences into a formula $$\ln\frac{\chi(x,t)}{G(x,t)} = -\beta t + b$$

to determine the attenuation coefficient of the actual electromagnetic wave field data,
  - wherein $X(x,t)$ is the actual electromagnetic wave field data, $G(x,t)$ is the loss-free electromagnetic wave field data, $\beta$ is the attenuation coefficient, t is time, x is a distance from a field source to a receiving point, and b is a constant.

* * * * *